United States Patent [19]
Thompson et al.

[11] Patent Number: 5,971,294
[45] Date of Patent: Oct. 26, 1999

[54] AGRICULTURAL APPLICATION SYSTEMS WITH IMPROVED SPRAY CONTROL

[75] Inventors: Warren L. Thompson, Kandiyohi; Brian Bielke, Glencoe; David Moen, Litchfield, all of Minn.

[73] Assignee: Agco Corp., Duluth, Ga.

[21] Appl. No.: 08/992,731

[22] Filed: Dec. 17, 1997

[51] Int. Cl.$^6$ .................................................. B05B 15/00
[52] U.S. Cl. .......................... 239/76; 239/69; 239/163; 239/170; 239/172; 239/556
[58] Field of Search .................. 239/310, 318, 239/159, 163, 167, 166, 170, 69, 70, 172, 562, 565, 557, 556, 168, 76

[56] References Cited

U.S. PATENT DOCUMENTS

| | | | |
|---|---|---|---|
| 2,895,680 | 7/1959 | Tavone | 239/76 |
| 3,139,848 | 7/1964 | Welty | 111/7 |
| 3,512,714 | 5/1970 | Phelps et al. | 239/172 |

(List continued on next page.)

FOREIGN PATENT DOCUMENTS

| | | |
|---|---|---|
| 571276 | 10/1958 | Belgium . |
| 1070872 | 12/1959 | Germany . |
| 14005555 | 7/1988 | Russian Federation . |

OTHER PUBLICATIONS

Stafford et al., "Spatially selective application of herbicide to cereal crops", *Computers and Electronics in Agriculture*, 9 (1993), pp. 217–219.
Rockwell et al., "Variable Rate Sprayer Development and Evaluation", Applied Engineering in Agriculture, vol. 10(3):327–333 (1994).
Rockwell et al., "Variable Rate, Direct Nozzle Injection Field Sprayer", Applied Engineering in Agriculture, vol. 12(5):531–538 (1996).
Trimble Brochure entitled "TrimFlight GPS Technical Overview", Copyright Nov. 1994.
Report entitled Past, Current and Future Collaboration between the USDA Forest service Pesticide application Technology Group, Forest Pest Management, Davis, CA and the New Zealand Forest Research Institute Plant Protection Chemistry Group, Rotorua, New Zealand.
Description of SATLOC products of Precision GPS Applications.
General Information about Drift Sentry, dated Dec., 1994.
Installation/Operator's Manual for MT–500™ Automatic Sprayer Control System.
Ayers–Final Project Report entitled Irrigation Technologies For Sustainable Farming Which Conserves Water and Protects Water quality (Jan., 1994).
Sudduth et al., "Performance of a Chemical Injection Sprayer System", Applied Engineering in Agriculture, vol. 11(3):343–348 (1955).
Chapin et al., "Measuring the Spatial Performance of Chemical Applicators", Copyright 1995.

(List continued on next page.)

*Primary Examiner*—Andres Kashnikow
*Assistant Examiner*—Dinh Q. Nguyen
*Attorney, Agent, or Firm*—Fitch, Even, Tabin & Flannery

[57] ABSTRACT

A spray system is provided with improved spray control having decreased injection lag, and reducing non-uniformity in injection lag throughout the length of a spray boom. A pump is coupled to spray nozzles installed along the spray boom by manifolds which divide the spray boom into a predetermined number of zones. Each zone has a respective boom manifold, and each boom manifold is coupled through equal length line to the spray nozzles. The size of lines coupling the pump to the boom manifolds varies with position along the spray boom and restricting orifices are used in some of the connecting lines. Application systems constructed according to principles of the present invention respond quicker to changes in pump operating points than conventional systems and variability of injection lag along the length of the spray boom is virtually eliminated with the present invention.

20 Claims, 2 Drawing Sheets

U.S. PATENT DOCUMENTS

| | | | |
|---|---|---|---|
| 3,782,634 | 1/1974 | Herman | 239/163 |
| 3,817,454 | 6/1974 | Pira | 239/76 |
| 3,917,166 | 11/1975 | Hildebrandt et al. | 239/1 |
| 4,043,506 | 8/1977 | Guido et al. | 239/76 |
| 4,121,767 | 10/1978 | Jensen | 239/71 |
| 4,217,647 | 8/1980 | Sjoholm et al. | 364/510 |
| 4,354,624 | 10/1982 | Chowdhury et al. | 222/608 |
| 4,358,054 | 11/1982 | Ehrat | 239/155 |
| 4,423,838 | 1/1984 | Dinur | 239/1 |
| 4,426,807 | 1/1984 | Maddock | 239/172 |
| 4,467,961 | 8/1984 | Coffee et al. | 239/1 |
| 4,518,118 | 5/1985 | Takata | 239/163 |
| 4,523,280 | 6/1985 | Bachman | 364/424 |
| 4,530,463 | 7/1985 | Hiniker et al. | 239/71 |
| 4,553,702 | 11/1985 | Coffee et al. | 239/690 |
| 4,630,773 | 12/1986 | Ortlip | 239/1 |
| 4,697,739 | 10/1987 | McCracken et al. | 239/172 |
| 4,703,891 | 11/1987 | Jackson et al. | 239/171 |
| 4,706,885 | 11/1987 | Morin | 239/76 |
| 4,714,196 | 12/1987 | McEachern et al. | 239/62 |
| 4,813,604 | 3/1989 | Curran, Jr. | 239/172 |
| 4,878,598 | 11/1989 | Ruschhaupt, Jr. | 222/1 |
| 4,967,957 | 11/1990 | Bachman | 239/62 |
| 4,991,341 | 2/1991 | Douglas | 47/1.7 |
| 4,997,129 | 3/1991 | Waldrum | 239/7 |
| 5,134,961 | 8/1992 | Giles et al. | 118/684 |
| 5,170,820 | 12/1992 | Jones | 137/899 |
| 5,220,876 | 6/1993 | Monson et al. | 111/130 |
| 5,260,875 | 11/1993 | Tofte et al. | 364/424 |
| 5,334,987 | 8/1994 | Teach | 342/357 |
| 5,337,959 | 8/1994 | Boyd | 239/163 |
| 5,348,226 | 9/1994 | Heiniger et al. | 239/1 |
| 5,407,134 | 4/1995 | Thompson et al. | 239/156 |
| 5,520,333 | 5/1996 | Tofte | 239/10 |
| 5,653,389 | 8/1997 | Henderson et al. | 239/172 |
| 5,704,546 | 1/1998 | Henderson et al. | 239/1 |

OTHER PUBLICATIONS

Hanson et al., "Mapping Wild Oats Infestation Using Digital Imagery for Site–Specific Management", Copyright 1995.

Jahns et al., Test results of electronic control units for field sprayers and future trends, Bulletin OEPP/EPPO Bulletin 26, 17–25 (1996).

Solle et al., "Optical Sensor Based Field Element Size and Sensing Strategy For Nitrogen Application", American Society of Agricultural Engineers, vol. 39(6):1983–1992 (1996).

AGRICULTURAL APPLICATION SYSTEMS WITH IMPROVED SPRAY CONTROL

BACKGROUND OF THE INVENTION

1. Field of the Invention

The present invention relates to agricultural application systems and in particular to such systems employing multiple segment boom sprayers.

2. Description of Related Art

Cost effective techniques for delivering agricultural chemicals to large size land surface areas have been undergoing continuous development. These systems typically employ a vehicle such as aircraft or a land based vehicle which is either self propelled or towed behind a tractor or the like. In the past, agricultural products to be applied to a land surface area were mixed, diluted or otherwise prepared for spraying in bulk quantities carried on the vehicle in large tanks. The vehicle is driven in a parallel fashion to cover the entire land surface area, one strip at a time. Typically, such coverage techniques require the vehicle to stop at periodic intervals so as to reverse direction, as when the end of a strip is reached. The vehicle is then turned about and is brought to operational speed as quickly as is practical. Most practical vehicle-based agricultural application systems employ a spray boom extending generally perpendicular to the direction of vehicle travel so as to increase the width of the strip formed by each traversal of the vehicle across the land surface area.

Over the years, various attempts have been made to improve the performance of vehicle-based application systems using spray booms. With the development of satellite navigation systems, there has been a recent emphasis in developing electronic controls for application systems which use satellite positional information to vary the dosage of chemical products "on the fly" as a spray vehicle traverses the land area being treated.

Computer-based controls not directly related to satellite navigation have been more intensely explored once a manufacturing commitment was made to provide on board computer capability for application vehicles. For example, U.S. Pat. Nos. 4,530,463; 4,553,702; and 5,337,959 are directed to agricultural spraying operations in which computer controls are applied to varied nozzle sizes and to control other aspects of the spraying operations. Despite these advances, problems inherent in practical agricultural application systems remain. For example, practical agricultural spray booms have grown to substantial sizes, as much 80 feet or more. It is preferred that, once a command to begin spraying is given, that chemical product be discharged from the various nozzles extending along the boom at the same time. It has been observed, however, that nozzles extending along the boom initiate spray delivery at varying times in response to a common control signal. For example, a "W" pattern of chemical concentration exiting the spray boom nozzles as a function of time has been observed. Ideally, the "W" pattern would be converted to a straight line pattern extending perpendicular to the direction of vehicle travel. Attainment of this goal in an economical and reliable manner is still being sought. Of course, these system problems are magnified when applied dosage rates are varied along the length of vehicle travel.

SUMMARY OF THE INVENTION

An object of the present invention is to provide an agricultural application system employing a spray boom with a plurality of nozzles arranged along the spray boom. It is an object of the present invention that, once command is given to initiate a spraying operation, or to change the dosage rate during vehicle travel, that all of the nozzles extending along the spray boom react substantially simultaneously.

A further object of the present invention is to provide an application system which avoids the use electronic sprayer controls such as those using the flow rate sensors coupled in a close loop to a microprocessor altering nozzle size or otherwise throttling flow to the nozzles of an application system. It is preferred instead that an agricultural application system be provided which is inherently uniform in its chemical output across the length of the spray boom, particularly during the initial period of time when dosage application rates are changed.

Another object of the present invention is to provide improvements in application systems employing multiple boom sprayers, and a related object of the present invention is to insure that the complete application system is maintained at the appropriate pressure so that the structural sections can be activated with a minimum of reaction time.

Yet another object of the present invention is to provide application systems having improvements of the type described above, and which employ a single pump to discharge chemicals to the various boom segments and the various nozzles within the boom segments.

Yet another object of the present invention is to reduce lead times required to initiate boom-wide uniform delivery once a command for a change of dosage rate (including turn on and turn off) is given.

These and other objects of the present invention which will become apparent from studying the appended description and drawings are provided in a field sprayer system for mounting to a vehicle frame comprising:

a product holding tank and a spray boom with means for mounting to said vehicle frame;

a pump means coupled to said product holding tank and having an output;

plural separate main feed lines coupled to said pump output, with at least some of said main feed lines having dissimilar internal sizes;

a spray boom with means for mounting to said vehicle and having a plurality of spaced nozzles, with plural ones of said nozzles being fed by respective nozzle manifolds;

said main feed lines being coupled to respective feed manifolds, having respective input and output means;

at least one of said nozzle manifolds being coupled to respective ones of said feed manifolds by similarly sized connecting lines; and flow restricting orifices in at least some of said feed lines, whereby, by controlling the output of said pump, product from said holding tank is delivered, substantially simultaneously, to said nozzles.

DETAILED DESCRIPTION OF THE PREFERRED EMBODIMENT

Figure 1:
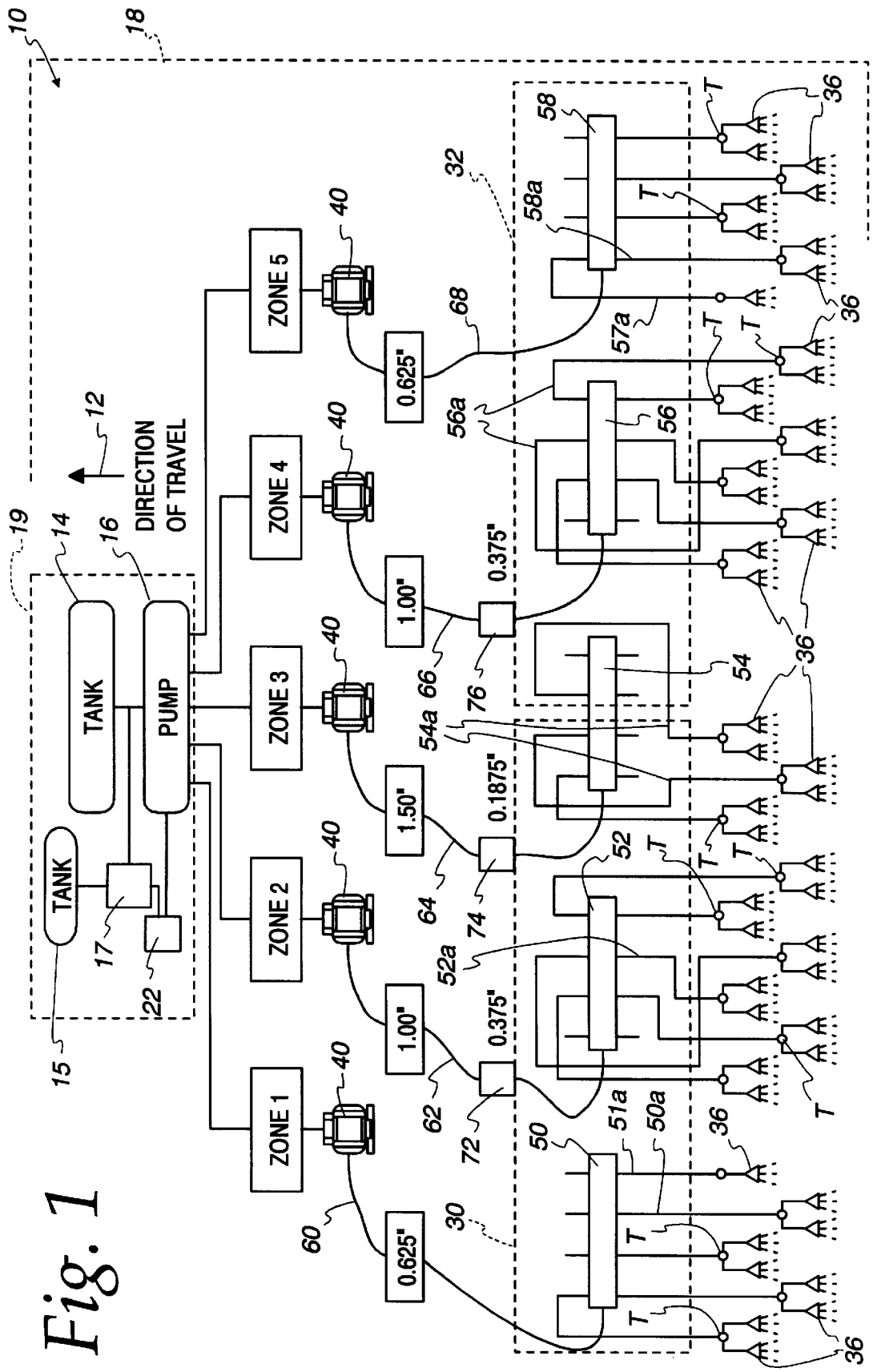
FIG. 1 is a schematic diagram of a vehicular application system according to the principles of the present invention.

Referring now to the drawings, FIG. 1 is a schematic diagram of a vehicular application system according to principles of the present invention. The vehicular application system 10 has found immediate commercial application for use in farm chemical delivery systems, either self-propelled (either a specialized vehicle, or a system mounted on a conventional tractor), or pulled by another vehicle. In particular, the present invention is concerned with the spray application of liquid chemicals. Application systems according to the principles of the present invention provide improved precision in the use of agricultural chemicals applied to a field. Further, as will be seen herein, the present invention provides particular advantages to systems which vary the rate of application of a chemical, particularly throughout the entirety of a field being treated. As will be seen herein, the present invention finds particular application for use with so-called "precision farming" procedures. As is known in the art, precision farming techniques utilize a application map which recognizes varying conditions requiring different chemical delivery rates throughout a field being treated. Frequently, such systems employ external navigation to locate the application vehicle's position, on a real time basis, with respect to the mapped field. Examples of such external navigation include satellite systems, such as Global Positioning Systems (GPS). In order to reliably deliver precise concentrations of a chemical to relatively small portions of a mapped field, spray delivery at the output of the system must be carefully controlled.

In order to improve labor efficiencies for spraying applications, equipment manufacturers have provided increasingly longer spray booms so that a larger swath can be covered for each traversal of the spray vehicle, across a field. Presently, spray boom lengths of 80 feet or more are known. The present invention has found immediate commercial application for use with relatively long spray boom lengths, even where it has been found convenient to divide the spray boom into two or more sections, located next to each other in side-by-side relationship. Two problems have been identified with conventional spraying systems, especially those using larger boom lengths. First, a spatially non-uniform pattern is briefly experienced as each change in spray application rate is carried out. Further, changes in spray applications rates have experienced an objectionably long "lag" times, or time delays before a change in chemical delivery rate is experienced at the spray nozzles. With regard to precision farming systems, either problem results in a failure of the application system to meet the requirements called for according to the application map.

Referring to FIG. 1, an application system is generally indicated at 10 and assumes a direction of travel indicated by arrow 12. Preferably, several tanks and at least one pump are carried on vehicle 18, which is either self-propelled or drawn by another vehicle. Preferably, a main tank 14, and at least one auxiliary tank 15 form a tank and pump assembly 19 which is carried on vehicle 18. As illustrated, main tank 14 is coupled to the input of pump 16, while auxiliary tank 15 is coupled through an injection means 17 to the pump input. A control system 22 controls both the operation of pump 16 and the injection means 17. In the preferred embodiment, the injection means 17 is operated for relatively short durations, compared to the operating time for the overall system. The injection means 17 may comprise an injection pump or, in a more simple arrangement, could comprise a conduit or manifold coupled to the input of pump 16. If desired, multiple auxiliary tanks may be employed, each one preferably coupled to the input of pump 16 through their respective injection means. In the most preferred embodiment, the main tank supplies a main mix whereas the auxiliary tank 15 injects an additive. For example, a field to be treated may principally require the application of a fertilizer and this would be provided by the main tank 14. However, recognizing that weed control may be required for certain portions of the field, weed control material is provided in the auxiliary tank 15 and injected into pump 16, as required. The pump 16 is of conventional construction and may, for example include one or more PTO driven constant speed pumps, hydraulically driven variable speed pumps or any of a variety of positive displacement metering pumps.

Although only a single auxiliary tank 15 is illustrated in FIG. 1, it should be understood that two or more auxiliary tanks could be coupled with the main tank 14 and pump 16 so as to provide the desired blended composition at the spray nozzles. For example, the main tank 14 could provide a source of water, with one or more auxiliary tanks and injection means providing concentrated chemicals to be mixed with and diluted by water from tank 14. The auxiliary tanks could include, for example, concentrated fertilizer and concentrated weed control material.

Although a single spray boom structure may be employed in carrying out the present invention, it is generally preferred that the spray boom structure be divided into two structural sections 30, 32 and it is preferred that each structural section have a generally equal length, so as to be easily folded when not in use. Although it is generally preferred that the components illustrated in FIG. 1 are carried on a common vehicle (such as the RANGER 7000 series from Willmar Manufacturing, Willmar, Minn.), the structural sections 30, 32 could be mounted on different vehicles, and further could be mounted on a vehicle different from vehicle 18 carrying the tank, pump and control systems described above.

In the preferred embodiment, a large number of spray nozzles (preferably 48) are distributed along an 80 foot boom length, divided, as mentioned above, in two 40 foot piping structures. It is generally preferred that all of the spray nozzles along the boom be employed to apply chemical products with each passage of vehicle 18 across a field surface. Preferably, application system 10 is operated with control signals applied to the pumps of tank and pump assemblies 14, 16. Control system 22 could, in its simplest form, comprise on/off switches which operate the pumps between flow-on and flow-off conditions. Alternatively, control system 22 could comprise any number of conventional systems which operate the pumps at maximum flow and reduced flow levels.

Further, as mentioned, the application system 10 has found immediate commercial acceptance for use with automated application-mapped control systems, especially those employing global positioning satellite systems. Control system 22 may comprise any of a variety of conventional control systems where a digitized application map of a field is made available to an on-board computer located on vehicle 18. An x-y locator, such as that derived from GPS information, is used to produce longitude and latitude coordinate signals which indicate the position of the vehicle, with respect to the field being treated. The on-board computer locates the position of the vehicle relative to the application map, determining the dispense or application rate for the soil currently being traversed. One example of a suitable control system is given in U.S. Pat. No. 4,630,773 (the disclosure of which is herein incorporated by reference as if fully set forth herein).

Under certain conditions, irregular flow distributions have been observed during conventional farming operations. For example, when auxiliary materials are injected into a main flow stream, an undesirable "W" pattern has been observed during injection start-up conditions, i.e., when a command to initiate injection of an auxiliary material is carried out by the vehicular-based spray application system. With the present trend toward providing more finely controlled material applications, such as those associated with precision farming techniques, the spatially non-uniform conditions described above are becoming increasingly objectionable, since they may be expected to occur many times during treatment of a farming field. With the commercial introduction of vehicular-based spraying, application systems according to the principles of the present invention, are effectively curtailed.

Referring to FIG. 1, in the preferred embodiment a relatively long boom is employed with 48 spray nozzles 36 (24 spray nozzles associated with each structural section 30, 32). According to one aspect of the present invention, the combined structural sections 30, 32 are divided into multiple (preferably five) application zones with application zone 3 being divided between the structural sections.

Referring again to FIG. 1, an optional valve/control unit 40 is associated with each spray application zone. The valve/control units 40 are provided for reduced spray patterns as may be required when traversing the edge of a field, where a full width application is not required and where overlapping spray coverage is sought to be avoided.

In application system 10, five boom manifolds 50–58 are employed, one associated with each spray application zone. In the preferred embodiment, the boom manifolds 50–58 are identical to one another, each having eight outputs. The outer manifolds 50 and 58 are coupled to nine spray nozzles, whereas the intermediate manifolds 52, 56 are each coupled to twelve spray nozzles. The central boom manifold 54 is coupled to six spray nozzles which, as mentioned, are equally divided between the two structural sections 30, 32.

As shown in FIG. 1, the five boom manifolds 50–58 are coupled to pump 16 by respective fluid line sections 60–68. As indicated in FIG. 1, the line sections 60–68 are preferably of at least two, and most preferably of three different internal flow sizes. For example, the outer line sections 60, 68 have an internal diameter of 0.625 inch, while the intermediate line sections 62, 66 have internal diameters of 1 inch. The central line section 64 has the largest internal diameter, 1.5 inches, to balance volume to each boom manifold. In the preferred embodiment, flow restrictions are employed in the line portions 62–66 to balance pressure drop to each manifold due to different line internal diameters and lengths. The greatest restriction is employed in the central line portion 64. A flow restricted 74 is applied between pump 16 and boom manifold 54, and has a size of 0.1875 inch. Flow restricters 72, 76 are employed in the intermediate line portions 62, 66 and each has a size of 0.375 inch. The purpose of these features is to help assure that injected products will be provided by the spray boom at the precise time desired.

It is generally preferred that the spray nozzles 36 be coupled in pairs by spray manifolds T, which preferably comprise a plumbing TEE fitting. In the preferred embodiment, only two of the 48 nozzles are directly coupled to boom manifolds (see boom manifolds 50, 58). These individual nozzles, and the valve manifolds T are coupled to their respective boom manifolds 50–58 by connecting lines 50a–58a, preferably of equal length with respect to each boom manifold, and most preferably of a common equal length throughout. If desired, the connecting lines 51a and 57a coupling the individual nozzles to their respective boom manifolds may be of a slightly smaller size or longer length than the remaining connecting lines if further refinement and balancing the nine spray nozzles of zones 1 and 5 is found to be necessary.

By employing principles of the present invention, each spray zone 1–5 is made to have an equal volume with the outer application zones 1 and 5 having the smallest size line portions 60, 68 and with the central line portion 64 having the largest size. Further, pressure drop across the five application zones is balanced by using flow restricting orifices 72–76 in the inner zones 2–4. The use of flow restricting orifices further balances pressure loss across each zone 1–5 to achieve equal pressure at each nozzle tip across the boom structure. Further, with principles of the present invention, volume in the outer zones 1 and 5 is minimized, consistent with an acceptable system-wide pressure loss. Accordingly, a uniform spray pattern results with each change in pump output, including spray application rate changes required by precision farming systems. Further, the lead factor or "injection lag" is reduced by one-half, and in certain instances, by a factor of as much as one-fourth to one-sixth. The term "injection lag" is used herein to refer the distance it take a product to travel from the injection point to the boom nozzles. A reduction in injection lag reduces the possibility of operator error.

Figure 2:
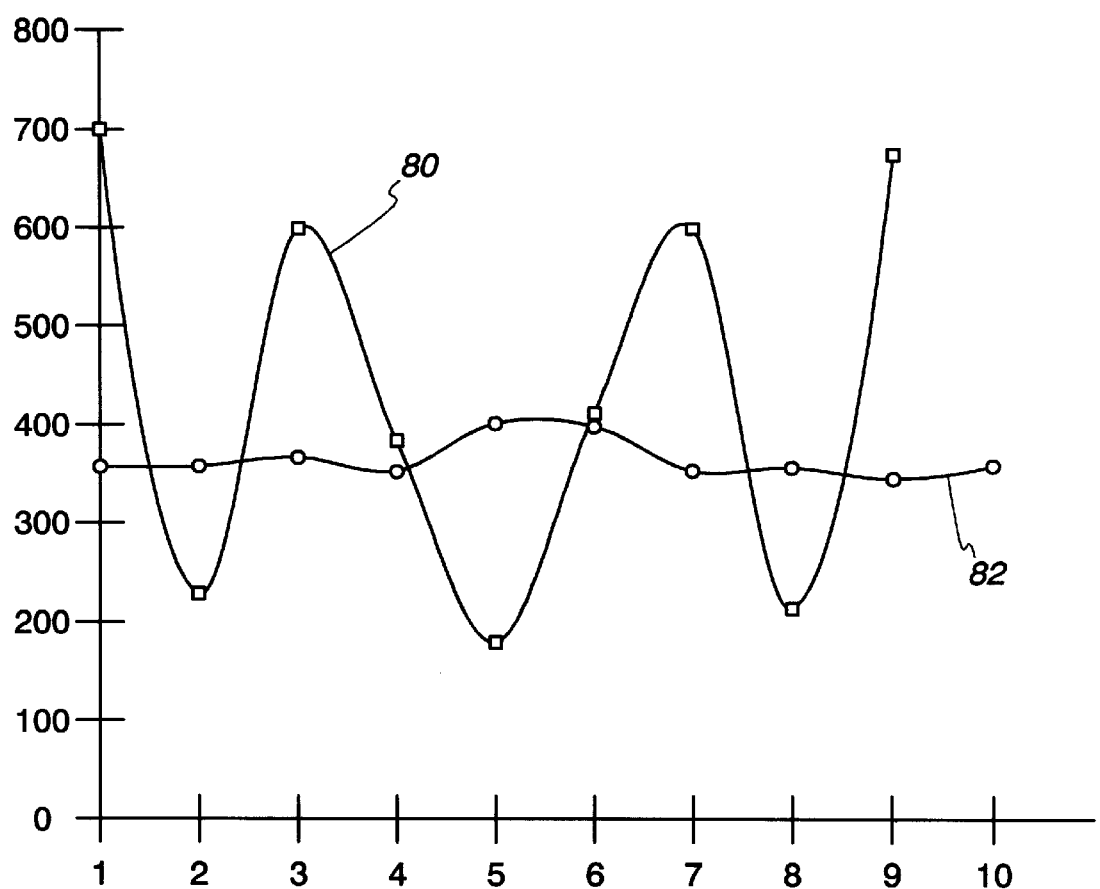
FIG. 2 shows test data in graphical form, illustrating the improvements made with the present invention.

Referring now to FIG. 2, the spray application system according to the principles of the present invention was tested under actual field conditions. As shown in FIG. 2, the Y axis indicates average lag distance measured in feet with the spray nozzles across the spray booms being divided into ten nozzle test locations indicated on the X axis. In FIG. 2, output curve 80 shows the performance of a 75 foot conventional spray boom, whereas curve 82 shows the performance of an 80 foot spray boom constructed according to the principles of the present invention. Both curves 80, 82 were developed with the same tank, pump and control system, with vehicles traveling at 10 miles per hour and delivering an application rate of 10 gallons per acre. As can be seen in curve 80 of FIG. 2, the nozzles of the conventional spray boom exhibit injection lags ranging between approximately 200 and 725 feet. As indicated by curve 82, injection lag distances ranging between 350 and 400 feet were observed. Thus, as can be readily observed from FIG. 2, the injection lag non-uniform response to changes in pump operating set points was substantially reduced, with variability along the length of the boom being diminished from a range of approximately 500 feet, to a range of approximately 50 feet.

Further, as can be observed from FIG. 2, the average injection lag for the spray boom taken as a whole, is also substantially reduced. With reference to FIG. 2, the conventional spray boom exhibiting a maximum injection lag of 725 feet performed slightly better than many spray booms in use today which exhibit injection lags of 1000 feet or more. As can be seen in FIG. 2, with principles of the present invention applied, the average injection lag distance is less than 400 feet. Thus, application systems constructed according to principles of the present invention respond quicker to changes in pump operating points than conventional systems and variability of injection lag along the length of the spray boom is virtually eliminated with the present invention.

As those skilled in the art will appreciate, once an injection lag offset is determined at a given flow rate, injection lag values for other flow rates can be mathematically determined using conventional techniques. Linearity of the system constructed according to the principles of the present invention was verified by visual observation of the application system, use clear connecting lines 60–68 and 50a–58a, and with a fluorescing dye as the chemical component. Visual observation of the dye front was observed as it moved to the nozzles, and markers were placed in the test field in order to obtain the performance data indicated in FIG. 2. Only a single pump is employed in the above-described system, and the only control input to the system is applied to that pump. The performance improvements in uniformity of injection lag throughout the spray boom length, and reduction in injection lag over all is made possible without requiring additional control inputs, and without requiring special components or expensive construction practices. In addition to reduced construction costs, systems according to the principles of the present invention are simpler to operate and maintain.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A field sprayer system for mounting to a vehicle frame comprising:
   a product holding tank and a spray boom with means for mounting to said vehicle frame;
   a pump means coupled to said product holding tank and having an output;
   plural separate main feed lines coupled to said pump output, with at least some of said main feed lines having dissimilar internal sizes;
   a spray boom with means for mounting to said vehicle and having a plurality of spaced nozzles, with plural ones of said nozzles being fed by respective nozzle manifolds;
   said main feed lines being coupled to respective feed manifolds, having respective input and output means;
   at least one of said nozzle manifolds being coupled to respective ones of said feed manifolds by similarly sized connecting lines; and
   flow restricting orifices in at least some of said feed lines, whereby, by controlling the output of said pump, product from said holding tank is delivered, substantially simultaneously, to said nozzles.

2. The system of claim 1 wherein said main lines range in size between 0.65 inch and 1.5 inches diameter.

3. The system according to claim 2 wherein several of the largest sized main feed lines only have flow restricting orifices coupling the main feed lines to the main manifolds.

4. The system according to claim 3 wherein said flow restricting orifices range in size between 0.1875 inch and 0.375 inch.

5. The system of claim 1 wherein said spray boom is comprised of two separate structural portions, with pluralities of nozzles located along each portion.

6. The system of claim 5 wherein at least one feed manifold supplies product to each of the two separate structural portions.

7. The system of claim 5 wherein the nozzles carried on each boom portion are fed by at least one entire feed manifold and a portion of another feed manifold.

8. The system of claim 5 wherein five feed manifolds are provided, two for each boom portion and one feeding nozzles in each of said boom portions.

9. The system of claim 1 wherein four nozzle manifolds are coupled to each feed manifold.

10. The system of claim 1 wherein said pump means comprises a positive displacement metering pump.

11. The system of claim 1 wherein product at the output of said pump means is controlled relative to the position of the sprayer system in the field.

12. The system of claim 11 wherein the position of the sprayer system within the field is determined through use of the Global Positioning Satellite system.

13. The system of claim 12 wherein output of said pump is controlled by comparing the position of the vehicle determined by the Global Positioning Satellite system in relation to an application map.

14. The system of claim 1 further comprising application map means for mapping the field, x-y position means for determining the position of the vehicle with respect to the field, comparison means for comparing the x-y position to the application map and for determining an application rate corresponding to the position on the application map, and means for controlling the pump means in response to determination of the application rate.

15. A field sprayer system, comprising:
   a vehicle frame;
   a pump means carried by said vehicle frame and having an input and an output;
   a main holding tank carried by said vehicle frame and coupled to the input of said pump means to provide a supply of a first product thereto;
   an auxiliary holding tank carried by said vehicle frame;
   an injection means coupling said auxiliary holding tank to the input of said pump means to provide a supply of a second product thereto;
   plural separate main feed lines coupled to said pump output, with at least some of said main feed lines having dissimilar internal sizes;
   a spray boom with means for mounting to said vehicle and having a plurality of spaced nozzles, with plural ones of said nozzles being fed by respective nozzle manifolds;
   said main feed lines being coupled to respective feed manifolds, having respective input and output means;
   at least one of said nozzle manifolds being coupled to respective ones of said feed manifolds by similarly sized connecting lines; and
   flow restricting orifices in at least some of said feed lines, whereby, said first and said second products provide for substantially simultaneous delivery to said nozzles.

16. The system of claim 15 wherein said main lines range in size between 0.65 inch and 1.5 inches diameter.

17. The system according to claim 16 wherein several of the largest sized main feed lines only have flow restricting orifices coupling the main feed lines to the main manifolds.

18. The system of claim 15 wherein product at the output of said pump means is controlled relative to the position of the sprayer system in the field.

19. The system of claim 18 wherein the position of the sprayer system within the field is determined through use of the Global Positioning Satellite system.

20. The system of claim 19 wherein output of said pump is controlled by comparing the position of the vehicle determined by the Global Positioning Satellite system in relation to an application map.

* * * * *